United States Patent [19]
Roberts et al.

[11] Patent Number: 5,845,323
[45] Date of Patent: *Dec. 1, 1998

[54] WAY PREDICTION STRUCTURE FOR PREDICTING THE WAY OF A CACHE IN WHICH AN ACCESS HITS, THEREBY SPEEDING CACHE ACCESS TIME

[75] Inventors: James S. Roberts; James K. Pickett, both of Austin, Tex.

[73] Assignee: Advanced Micro Devices, Inc., Sunnyvale, Calif.

[ * ] Notice: The term of this patent shall not extend beyond the expiration date of Pat. No. 5,752,069.

[21] Appl. No.: 884,819

[22] Filed: Jun. 30, 1997

Related U.S. Application Data

[63] Continuation of Ser. No. 522,181, Aug. 31, 1995, abandoned.

[51] Int. Cl.⁶ .................................................. G06F 15/80
[52] U.S. Cl. ........................................... 711/128; 711/137
[58] Field of Search .................................. 711/128, 137, 711/140

[56] References Cited

U.S. PATENT DOCUMENTS

| 4,044,338 | 8/1977 | Wolf . | |
|---|---|---|---|
| 4,453,212 | 6/1984 | Gaither et al. . | |
| 4,807,115 | 2/1989 | Torng . | |
| 4,858,105 | 8/1989 | Kuriyama et al. . | |
| 5,226,126 | 7/1993 | McFarland et al. . | |
| 5,226,130 | 7/1993 | Favor et al. . | |
| 5,235,697 | 8/1993 | Steely, Jr. et al. | 395/464 |

FOREIGN PATENT DOCUMENTS

| 0259095 | 3/1988 | European Pat. Off. . |
|---|---|---|
| 0381471 | 8/1990 | European Pat. Off. . |
| 0459232 | 12/1991 | European Pat. Off. . |
| 0 467 152 | 1/1992 | European Pat. Off. . |
| 0 651 321 | 5/1995 | European Pat. Off. . |
| 0 675 443 | 10/1995 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Gwennap, Linley, "Mips R10000 uses decoupled architecture; high–performance . . . " Microprocessor Report, V8, h14, p. 18(4) (from DIALOG®).

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

International Search Report for PCT/US 96/17518 dated Jun. 25, 1997.

Primary Examiner—David L. Robertson
Attorney, Agent, or Firm—Conley, Rose & Tayon, PC; B. Noel Kivlin; Lawrence J. Merkel

[57] ABSTRACT

A way prediction structure is provided which predicts a way of an associative cache in which an access will hit, and causes the data bytes from the predicted way to be conveyed as the output of the cache. The typical tag comparisons to the request address are bypassed for data byte selection, causing the access time of the associative cache to be substantially the access time of the direct-mapped way prediction array within the way prediction structure. Also included in the way prediction structure is a way prediction control unit configured to update the way prediction array when an incorrect way prediction is detected. The clock cycle of a superscalar microprocessor including the way prediction structure with its caches may be increased if the cache access time is limiting the clock cycle. Additionally, the associative cache may be retained in the high frequency superscalar microprocessor (which might otherwise employ a direct-mapped cache for access time reasons). Single clock cycle cache access to an associative data cache is maintained for high frequency operation.

16 Claims, 3 Drawing Sheets

WAY PREDICTION STRUCTURE FOR PREDICTING THE WAY OF A CACHE IN WHICH AN ACCESS HITS, THEREBY SPEEDING CACHE ACCESS TIME

This application is a continuation of application Ser. No. 08/522,181, filed Aug. 31, 1995, now abandoned.

BACKGROUND OF THE INVENTION

1. Field of the Invention

This invention is related to the field of superscalar microprocessors and, more particularly, to way prediction structures employed within superscalar microprocessors in order to allow associative cache accesses at speeds comparable to direct-mapped cache accesses.

2. Description of the Relevant Art

Superscalar microprocessors achieve high performance by simultaneously executing multiple instructions in a clock cycle and by specifying the shortest possible clock cycle consistent with the design. As used herein, the term "clock cycle" refers to an interval of time during which the pipeline stages of a microprocessor perform their intended functions. At the end of a clock cycle, the resulting values are moved to the next pipeline stage.

Since superscalar microprocessors execute multiple instructions per clock cycle and the clock cycle is short, a high bandwidth memory system is required to provide instructions and data to the superscalar microprocessor (i.e. a memory system that can provide a large number of bytes in a short period of time). Without a high bandwidth memory system, the microprocessor would spend a large number of clock cycles waiting for instructions or data to be provided, then would execute the received instructions and/or the instructions dependent upon the received data in a relatively small number of clock cycles. Overall performance would be degraded by the large number of idle clock cycles. However, superscalar microprocessors are ordinarily configured into computer systems with a large main memory composed of dynamic random access memory (DRAM) cells. DRAM cells are characterized by access times which are significantly longer than the clock cycle of modern superscalar microprocessors. Also, DRAM cells typically provide a relatively narrow output bus to convey the stored bytes to the superscalar microprocessor. Therefore, DRAM cells provide a memory system that provides a relatively small number of bytes in a relatively long period of time, and do not form a high bandwidth memory system.

Because superscalar microprocessors are typically not configured into a computer system with a memory system having sufficient bandwidth to continuously provide instructions and data, superscalar microprocessors are often configured with caches. Caches are storage devices containing multiple blocks of storage locations, configured on the same silicon substrate as the microprocessor or coupled nearby. The blocks of storage locations are used to hold previously fetched instruction or data bytes. The bytes can be transferred from the cache to the destination (a register or an instruction processing pipeline) quickly; commonly one or two clock cycles are required as opposed to a large number of clock cycles to transfer bytes from a DRAM main memory.

Caches may be organized into an "associative" structure (also referred to as "set associative"). In an associative structure, the blocks of storage locations are accessed as a two-dimensional array having rows (often referred to as "sets") and columns (often referred to as "ways"). When a cache is searched for bytes residing at an address, a number of bits from the address are used as an "index" into the cache. The index selects a particular set within the two-dimensional array, and therefore the number of address bits required for the index is determined by the number of sets configured into the cache. The act of selecting a set via an index is referred to as "indexing". The addresses associated with bytes stored in the multiple blocks of a set are examined to determine if any of the addresses stored in the set match the requested address. If a match is found, the access is said to be a "hit", and the cache provides the associated bytes. If a match is not found, the access is said to be a "miss". When a miss is detected, the bytes are transferred from the memory system into the cache. The addresses associated with bytes stored in the cache are also stored. These stored addresses are referred to as "tags" or "tag addresses".

The blocks of memory configured into a set form the columns of the set. Each block of memory is referred to as a "way"; multiple ways comprise a set. The way is selected by providing a way value to the cache. The way value is determined by examining the tags for a set and finding a match between one of the tags and the requested address. A cache designed with one way per set is referred to as a "direct-mapped cache". In a direct-mapped cache, the tag must be examined to determine if an access is a hit, but the tag examination is not required to select which bytes are transferred to the outputs of the cache. Since only an index is required to select bytes from a direct-mapped cache, the direct-mapped cache is a "linear array" requiring only a single value to select a storage location within it.

Both direct-mapped and associative caches are employed in high frequency (i.e. short clock cycle) superscalar microprocessors. In high frequency applications, set associative caches either become a clock cycle limiter or require multiple clock cycles to complete a cache access because the comparison of tags to the request address and the subsequent selection of data bytes to convey to the output requires more time than the desired clock cycle time allows. Cache bandwidth (i.e. the number of cache requests which may be made per clock cycle) decrease due to multiple clock cycle accesses is particularly detrimental to superscalar microprocessors attempting to execute multiple instructions (which may require cache access) per clock cycle. Although cache bandwidth decrease may be avoided by pipelining the cache access, the latency for each access is still detrimental to performance. Longer clock cycles are also detrimental to the performance of a microprocessor, since fewer instructions may be executed per second.

Direct-mapped caches, which compare the selected tag to the request address in parallel with conveying data bytes to the output, operate in less time than the associative cache. Unfortunately, direct-mapped caches are associated with lower hit rates (i.e. the percentage of accesses that are hits) than associative caches with a similar storage capacity. Furthermore, direct-mapped caches are more susceptible to "thrashing". Thrashing is a phenomenon that occurs when the pattern of address requests presented to the cache contains several dissimilar addresses with the same index. Dissimilar addresses are addresses that are stored in the cache with different tags. As an illustrative example, addresses A and B may access the cache alternately and repeatedly. Address A and address B have the same index, and access a direct-mapped cache. First, address A accesses the cache and misses. The indexed cache storage location is filled with bytes associated with address A. Next, address B accesses the cache and misses. The indexed cache storage location discards the bytes associated with address A and is filled with bytes associated with address B. Address A accesses the cache again, and misses. The cache storage location discards the bytes associated with address B and is filled with bytes associated with address A. An associative cache would be able to store bytes associated with both address A and address B simultaneously. A storage device having the access time of a direct-mapped cache with the hit rate and insensitivity to thrashing of an associative cache is desired.

SUMMARY OF THE INVENTION

The problems outlined above are in large part solved by a way prediction structure according to the present invention. The present way prediction structure includes a way prediction array and a way prediction control unit. The way prediction structure described herein predicts a way of an associative data cache in which an access will hit, and causes the data bytes from the predicted way to be conveyed as the output of the data cache. The typical tag comparisons to the input request address are bypassed for data byte selection. Advantageously, the access time of the associative cache is substantially the access time of the direct-mapped way prediction array. The present associative cache and way prediction structure enable increased performance in a high frequency superscalar microprocessor in several ways. First, the clock cycle of the superscalar microprocessor may be increased if the cache access time is limiting the clock cycle (as is typically the case), since the cache access time of the associative cache is shortened. Second, the associative cache is retained in the high frequency superscalar microprocessor (which might otherwise employ a direct-mapped cache for access time reasons). The advantages of an associative cache over a direct-mapped cache, including insensitivity to thrashing and superior hit rate characteristics, are thereby available at higher frequencies then were previously attainable.

As a result of the shortened access time enabled by the present invention, single clock cycle cache access to an associative data cache is maintained for high frequency operation. Since most operations complete cache access in a single cycle, the cache bandwidth (as measured in accesses per clock cycle) is higher than a cache in which accesses require multiple cycles. The increased cache bandwidth is advantageously available for additional cache accesses. Additionally, performance may be advantageously increased by the reduced latency associated with performing the access in a single clock cycle. Cache bandwidth increase and latency decrease are particularly valuable to superscalar microprocessors in which multiple instructions (possibly requiring cache access) are executed in a given clock cycle.

Broadly speaking, the present invention contemplates a way prediction structure for a cache comprising a way prediction array and a way prediction control unit. The way prediction array includes a plurality of storage locations wherein each one of the plurality of storage locations is configured to store a way value. The way prediction array is configured to receive at least one request address. Coupled to the way prediction array, the way prediction control unit is configured to update the way prediction array.

BRIEF DESCRIPTION OF THE DRAWINGS

Other objects and advantages of the invention will become apparent upon reading the following detailed description and upon reference to the accompanying drawings in which.

Figure 1:
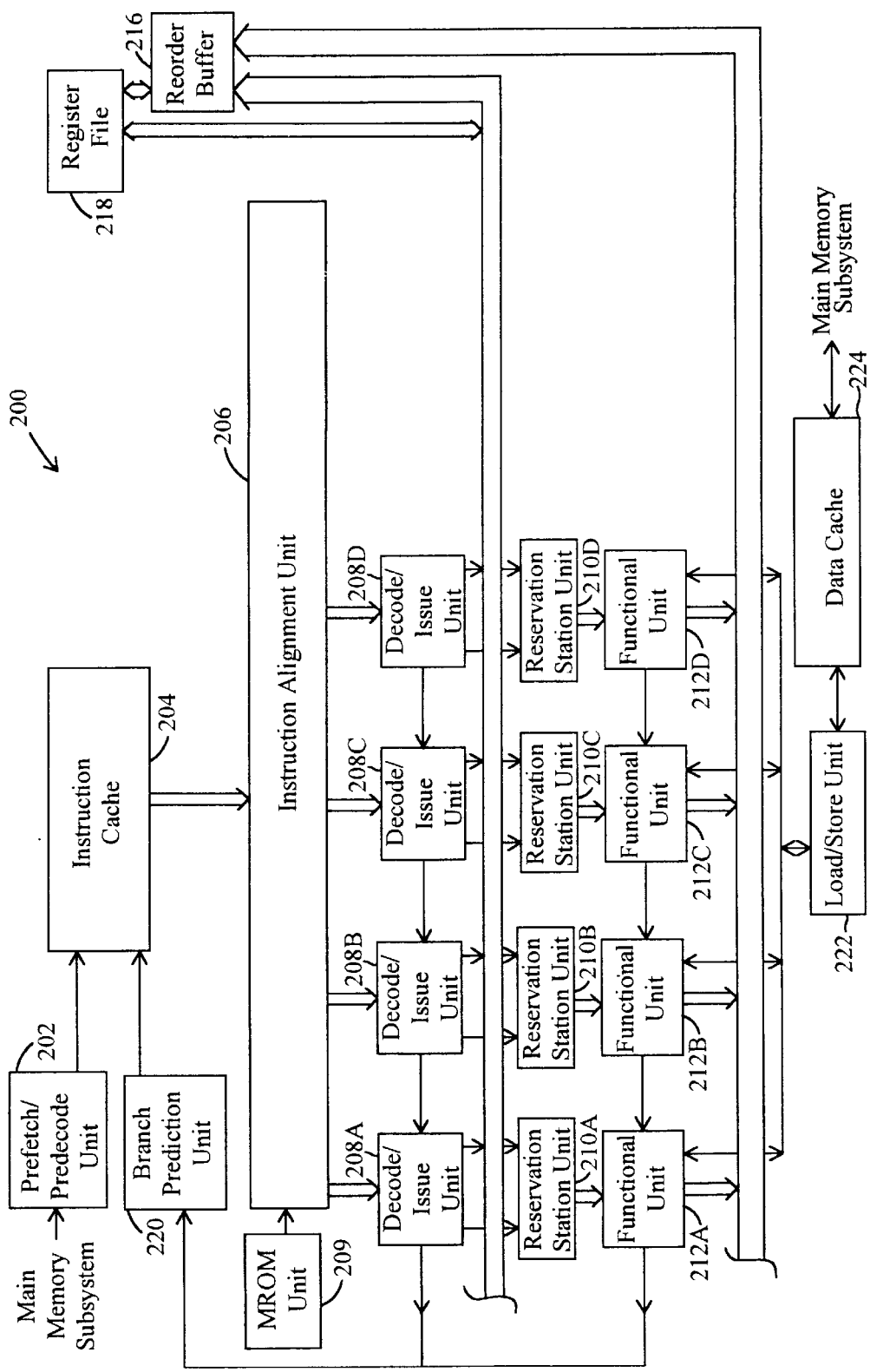
FIG. 1 is a block diagram of a superscalar microprocessor including a data cache having a way prediction structure according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring next to FIG. 1, a block diagram of a superscalar microprocessor 200 including a data cache 224 in accordance with the present invention is shown. As illustrated in the embodiment of FIG. 1, superscalar microprocessor 200 includes a prefetch/predecode unit 202 and a branch prediction unit 220 coupled to an instruction cache 204. Instruction alignment unit 206 is coupled between instruction cache 204 and a plurality of decode units 208A–208D (referred to collectively as decode units 208). Each decode unit 208A–208D is coupled to respective reservation station units 210A–210D (referred to collectively as reservation stations 210), and each reservation station 210A–210D is coupled to a respective functional unit 212A–212D (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM unit 209 is shown coupled to instruction alignment unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/predecode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/predecode unit 202 is configured to burst 64-bit wide code from the main memory into instruction cache 204. It is understood that a variety of specific code prefetching techniques and algorithms may be employed by prefetch/predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209, as will be described in greater detail below.

Table 1 indicates one encoding of the predecode tags. As indicated within the table, if a given byte is the first byte of an instruction, the start bit for that byte is set. If the byte is the last byte of an instruction, the end bit for that byte is set. If a particular instruction cannot be directly decoded by the decode units 208, the functional bit associated with the first byte of the instruction is set. On the other hand, if the instruction can be directly decoded by the decode units 208, the functional bit associated with the first byte of the instruction is cleared. The functional bit for the second byte of a particular instruction is cleared if the opcode is the first byte, and is set if the opcode is the second byte. It is noted that in situations where the opcode is the second byte, the first byte is a prefix byte. The functional bit values for instruction byte numbers 3–8 indicate whether the byte is a MODRM or an SIB byte, or whether the byte contains displacement or immediate data.

TABLE 1

Encoding of Start, End and Functional Bits

| Instr. Byte Number | Start Bit Value | End Bit Value | Functional Bit Value | Meaning |
| --- | --- | --- | --- | --- |
| 1 | 1 | X | 0 | Fast decode |
| 1 | 1 | X | 1 | MROM instr. |
| 2 | 0 | X | 0 | Opcode is first byte |
| 2 | 0 | X | 1 | Opcode is this byte, first byte is prefix |
| 3–8 | 0 | X | 0 | Mod R/M or SIB byte |
| 3–8 | 0 | X | 1 | Displacement or immediate data; the second functional bit set in bytes 3–8 indicates immediate data |
| 1–8 | X | 0 | X | Not last byte of instruction |
| 1–8 | X | 1 | X | Last byte of instruction |

As stated previously, in one embodiment certain instructions within the x86 instruction set may be directly decoded by decode unit 208. These instructions are referred to as "fast path" instructions. The remaining instructions of the x86 instruction set are referred to as "MROM instructions". MROM instructions are executed by invoking MROM unit 209. More specifically, when an MROM instruction is encountered, MROM unit 209 parses and serializes the instruction into a subset of defined fast path instructions to effectuate a desired operation.

Instruction alignment unit 206 is provided to channel variable byte length instructions from instruction cache 204 to fixed issue positions formed by decode units 208A–208D. Instruction alignment unit 206 independently and in parallel selects instructions from three groups of instruction bytes provided by instruction cache 204 and arranges these bytes into three groups of preliminary issue positions. Each group of issue positions is associated with one of the three groups of instruction bytes. The preliminary issue positions are then merged together to form the final issue positions, each of which is coupled to one of decode units 208.

Before proceeding with a detailed description of the data cache 224, general aspects regarding other subsystems employed within the exemplary superscalar microprocessor 200 of FIG. 1 will be described. For the embodiment of FIG. 1, each of the decode units 208 includes decoding circuitry for decoding the predetermined fast path instructions referred to above. In addition, each decode unit 208A–208D routes displacement and immediate data to a corresponding reservation station unit 210A–210D. Output signals from the decode units 208 include bit-encoded execution instructions for the functional units 212 as well as operand address information, immediate data and/or displacement data.

The superscalar microprocessor of FIG. 1 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208D are routed directly to respective reservation station units 210A–210D. In one embodiment, each reservation station unit 210A–210D is capable of holding instruction information (i.e., bit encoded execution bits as well as operand values, operand tags and/or immediate data) for up to three pending instructions awaiting issue to the corresponding functional unit. It is noted that for the embodiment of FIG. 1, each decode unit 208A–208D is associated with a dedicated reservation station unit 210A–210D, and that each reservation station unit 210A–210D is similarly associated with a dedicated functional unit 212A–212D. Accordingly, four dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the x86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, is determined to modify the contents of one of the real registers. Therefore, at various points during execution of a particular program, reorder buffer 216 may have one or more locations which contain the speculatively executed contents of a given register. If following decode of a given instruction it is determined that reorder buffer 216 has a previous location or locations assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Details regarding suitable reorder buffer implementations may be found within the publication "Superscalar Microprocessor Design" by Mike Johnson, Prentice-Hall, Englewood Cliffs, N.J., 1991, and within the co-pending, commonly assigned patent application entitled "High Performance Superscalar Microprocessor", Ser. No. 08/146,382, filed Oct. 29, 1993 by Witt, et al. These documents are incorporated herein by reference in their entirety.

Reservation station units 210A–210D are provided to temporarily store instruction information to be speculatively executed by the corresponding functional units 212A–212D. As stated previously, each reservation station unit 210A–210D may store instruction information for up to three pending instructions. Each of the four reservation stations 210A–210D contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212D, the result of that instruction is passed directly to any reservation station units 210A–210D that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210D has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, branch prediction unit 220 flushes instructions subsequent to the mispredicted branch that have entered the instruction processing pipeline, and causes prefetch/predecode unit 202 to fetch the required instructions from instruction cache 204 or main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210D where pending instructions may be waiting for the results of previous instruction executions to obtain the required operand values.

Generally speaking, load/store unit 222 provides an interface between functional units 212A–212D and data cache 224. In one embodiment, load/store unit 222 is configured with a load/store buffer with eight storage locations for data and address information for pending loads or stores. Decode units 208 arbitrate for access to the load/store unit 222. When the buffer is full, a decode unit must wait until the load/store unit 222 has room for the pending load or store request information. The load/store unit 222 also performs dependency checking for load instructions against pending store instructions to ensure that data coherency is maintained.

Data cache 224 is a high speed cache memory provided to temporarily store data being transferred between load/store unit 222 and the main memory subsystem. In one embodiment, data cache 224 has a capacity of storing up to sixteen kilobytes of data. It is understood that data cache 224 may be implemented in a variety of specific memory configurations, including a set associative configuration.

Figure 2:
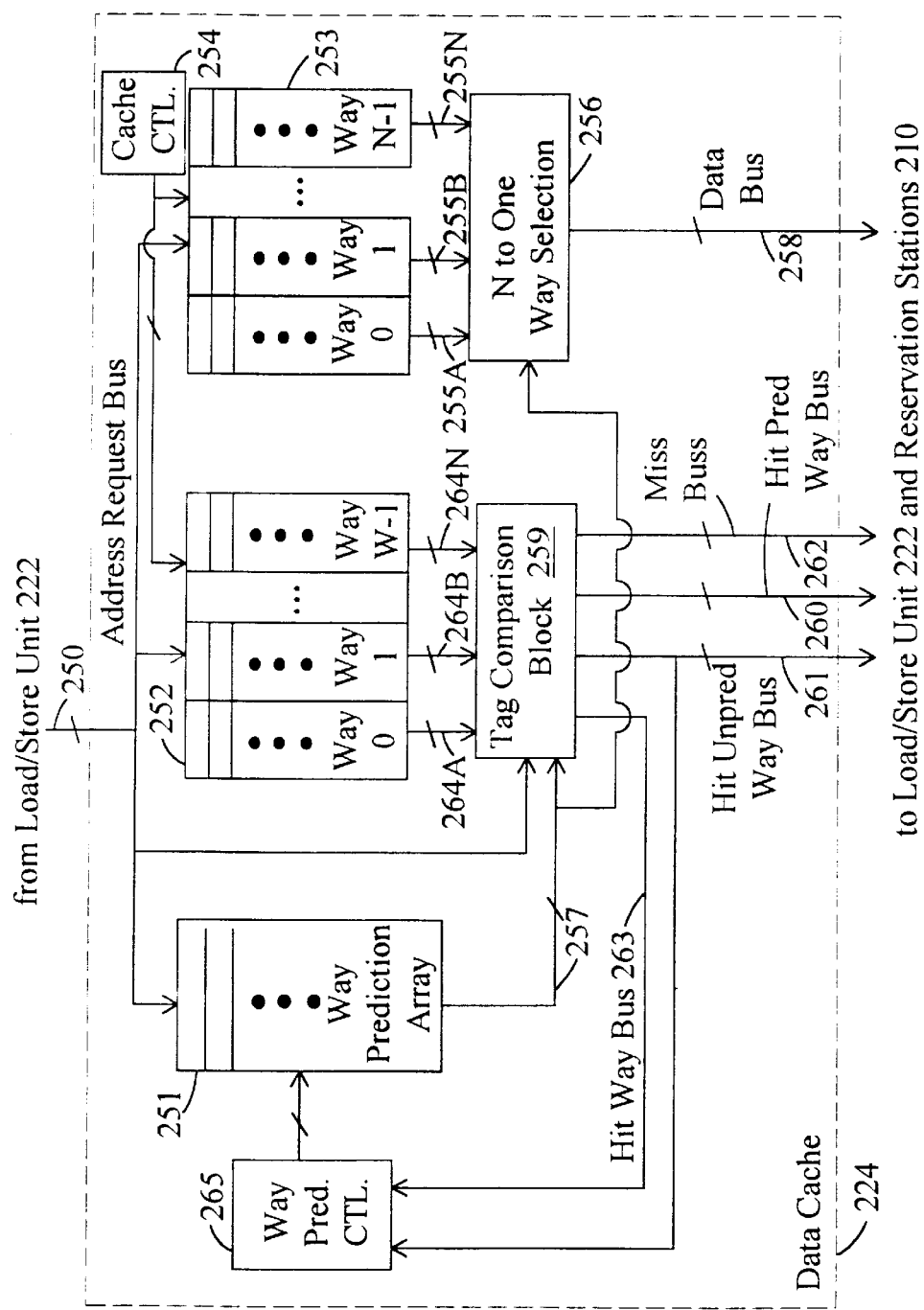
FIG. 2 is a block diagram of the data cache shown in FIG. 1, depicting several portions of one embodiment of the way prediction structure according to the present invention.

Turning next to FIG. 2, a block diagram of data cache 224 is shown including a way prediction structure according to the present invention. For simplicity, only those elements of data cache 224 pertaining to the present invention are shown. Generally speaking, the way prediction structure predicts a way of data cache 224 in which a request address may hit, and causes the predicted way to be selected as the output data bytes of data cache 224. Therefore, the tag comparisons typically required by an associative data cache are bypassed in performing the way selection. The data may be available at the output of the data cache after a time delay from the start of the access similar to the time delay of a direct-mapped cache. If the way prediction is correct, single cycle access of an associative cache is achieved, and the clock cycle may be consistent with a direct-mapped cache access. If the way prediction is incorrect but the request address hits in another way, then a subsequent clock cycle is used to fetch the correct data and to update the way prediction to the hitting way. If the request address is a miss, then the way prediction is left unchanged and the miss is processed.

Each clock cycle, load/store unit 222 may convey one or more cache access requests on an address request bus 250 to data cache 224. In one embodiment, load/store unit 222 is configured to convey up to two requests per clock cycle. Each request includes an address and request identification information including an indication of whether the request is associated with a load or a store instruction. Address request bus 250 is coupled to input ports on a way prediction array 251, a cache tag array 252, and a cache data array 253. Way prediction array 251 is configured to store way predictions for data cache 224. Cache tag array 252 stores tags for the data stored in data cache 224. The data bytes are stored in cache data array 253. A cache control unit 254 is coupled to cache tag array 252 and cache data array 253. Cache control unit 254 is configured to provide cache control functions, such as managing the replacement algorithm for data cache 224 and creating byte enables for store cache accesses.

As shown in FIG. 2, cache tag array 252 and cache data array 253 are N-way set associative. Each clock cycle, N sets of data bytes are conveyed from output ports of cache data array 253 on a set of way data buses 255A–255N (collectively referred to as way data buses 255). Each of way data buses 255 conveys data bytes from a particular way indexed by addresses conveyed on address request bus 250. One set of data bytes is conveyed on each of way data buses 255 for each address which may be conveyed on address request bus 250 in a given clock cycle. In one embodiment, data cache 224 is eight-way set associative.

Way data buses 255 are coupled to an N-to-One way selection block 256. In one embodiment, way selection block 256 is a set of multiplexors (one for each address which may be conveyed on address request bus 250). Each multiplexor is coupled to way data buses 255 and to a way prediction bus 257 from way prediction array 251. A way prediction for each requested address is conveyed from output ports of way prediction array 251 on way prediction bus 257 to way selection block 256. The way prediction is indicative of one of the N ways of data cache 224. In one embodiment, a way prediction comprises a decoded value wherein a particular way is indicated through the setting of a particular bit within the decoded value. In another embodiment, the value is encoded as a number between zero and N–1 wherein each value corresponds to the selected way. The data bytes associated with the predicted way for each request address are conveyed on a data bus 258 to load/store unit 222 and reservation stations 210.

Way prediction array 251 is configured to store way predictions for data cache 224. While cache tag array 252 and cache data array 253 are configured similarly with respect to numbers of ways and numbers of sets, way prediction array may be configured differently. In particular, more than one way prediction for a particular set of cache tag array 252 and cache data array 253 may be stored within way prediction array 251. For example, if way prediction array 251 is configured with twice as many sets as cache tag array 252 and cache data array 253, then two way predictions will be stored within way prediction array 251 for each set of cache tag array 252 and cache data array 253. The number of bits of the request address used to index way prediction array 251 would be one larger than the number used to index cache tag array 252 and cache data array 253 for this example, and the extra bit determines which of the two stored way predictions is selected as the way prediction for that request address. It is noted that the likelihood of storing a correct way prediction for a given address is increased by the number of way predictions stored for the indexed set of cache tag array 252 and cache data array 253. Performance may therefore be increased by using a way prediction array having more than one way prediction per set of cache tag array 252 and cache data array 253. In one embodiment, way prediction array 251 is a linear array of 512 way predictions, and each way prediction is a decoded value as described above. Generally speaking, a preferred embodiment of way prediction array 251 is a linear array comprising a number of way prediction storage locations equal in number to the number of sets multiplied by the number of ways in data cache array 253.

While a request address is indexing into cache tag array 252 and cache data array 253, the request address is also indexing into way prediction array 251. Way prediction array 251 conveys the indexed way prediction on way prediction bus 257, causing the data bytes associated with the predicted way to be conveyed on data bus 258. Therefore, the time delay from the beginning of an access to data being provided by data cache 224 is characterized by the time delay of a direct-mapped cache access (way prediction array 251) followed by a small delay associated with the selection of output bytes using the predicted way. Such a time delay is substantially similar to the access time of a direct-mapped cache. Advantageously, associative data cache 224 is characterized by a direct-mapped cache access time.

Additionally, way prediction bus 257 is coupled to a tag comparison block 259. Tag comparison block 259 embodies logic circuits configured to determine whether or not the request address hits in the predicted way, hits in an unpredicted way, or misses. Tag comparison block 259 compares the indexed tags (as conveyed on a set of way tag buses 264A–264N similar to way data buses 255) to the request address, then determines if the actual hit way from the tag comparisons matches the predicted way from way prediction array 251. Since the access to cache tag array 252 and the tag comparisons that follow may not complete in a given clock cycle, tag comparison block 259 produces signals early in a clock cycle subsequent to the clock cycle in which the associated addresses access data cache 224.

If a hit in the predicted way is detected for a load request, a signal is asserted on a hit predicted way bus 260. Hit predicted way bus 260 is coupled between tag comparison block 259 and load/store unit 222 and reservation stations 210. A signal associated with each possible request address is conveyed on hit predicted way bus 260, and both load/store unit 222 and reservation stations 210 are configured to associate each signal with the appropriate address request from the previous clock cycle. A hit in the predicted way indicates that the data conveyed on data bus 258 in the previous clock cycle is correct. Reservation stations 210 may then discard any instructions which received the data and executed in the current clock cycle, and load/store unit 222 may discard the load instruction associated with the requested address.

If a hit in an unpredicted way is detected for a load request, a corresponding signal is asserted on a hit unpredicted way bus 261 which is coupled to load/store unit 222 and reservation stations 210. A hit in an unpredicted way causes load/store unit 222 to cancel a request address conveyed on the portion of request address bus 250 upon which the unpredicted way hit address was conveyed in the previous clock cycle. Data cache 224 uses the idle port to convey the correct data on data bus 258. The way prediction is corrected while the corrected data is conveyed on data bus 258. The way prediction is corrected via a way prediction control unit 265. Way prediction control unit 265 receives a hit way bus 263 and hit unpredicted way bus 261. When a hit in an unpredicted way signal is asserted, the way in which the hit occurs is conveyed on hit way bus 263. Way prediction control unit 265 conveys the hitting way to a write port on way prediction array 251, and signals way prediction array 251 to write the value into the location indexed by the associated address stored by data cache 224 from the previous clock cycle. Thus, a hit in an unpredicted way is penalized only a clock cycle. Additionally, reservation stations 210 detect the hit in the unpredicted way and cause the data forwarded in the previous clock cycle with respect to the associated address to be invalidated. If an instruction which received the incorrect data as an operand is currently being executed by the respective functional unit 212, reservations stations 210 assert a signal to other reservation stations and reorder buffer 216 indicative of the incorrect data so that the other reservation stations and reorder buffer 216 ignore any results from executing an instruction with the incorrect data. Additionally, a finctional unit 212 which received the incorrect data sends a cancel indication along with the value it calculates using the incorrect data during this clock cycle such that the reorder buffer 216 does not record the incorrect value and such that reservation stations 210 ignore the forwarded value.

If a miss is detected, a corresponding signal is asserted on a miss bus 262 which is coupled to load/store unit 222 and reservation stations 210. Load/store unit 222 records the miss for later miss processing, and reservation stations 210 perform similar actions to the case of a hit in an unpredicted way described above. Way prediction array 251 is not modified for this case, since there is no correct predicted way for a cache miss. In another embodiment, miss bus 262 is not included and a miss is detected via the absence of appropriate signal assertions upon hit predicted way bus 260 and hit unpredicted way bus 261.

It is noted that the above discussion applies to the effects of way prediction on load accesses to data cache 224. Store requests may be performed according to the disclosure in a commonly assigned, co-pending patent application entitled: "A Data Cache Capable of Performing Store Accesses in a Single Clock Cycle", filed concurrently herewith by Witt, et al. The disclosure of this patent application is incorporated herein by reference in its entirety. Otherwise, store requests are performed as two accesses in subsequent clock cycles. During a first access, the way of data cache 224 storing bytes associated with the store address is determined. The way prediction structure returns the predicted way. During a second access, the store is performed to the way determined in the first access. If the predicted way is found to be incorrect, the second access is cancelled and the correct way is recorded by load/store unit 222 during a repeat of the first access (similar to the load access hit in an unpredicted way, described above). During a clock cycle subsequent to the repeated first access, the second access is performed. Cache control unit 254 is configured to generate byte enables for data cache 224 such that only the bytes affected by the store request are overwritten within the selected storage location. Other bytes are left unchanged.

In one embodiment, way prediction array 251 is initialized at power up of microprocessor 200 such that way zero is the way prediction stored in each entry. Subsequent accesses to data cache 224 cause the various stored way predictions to change as described above.

Figure 3:
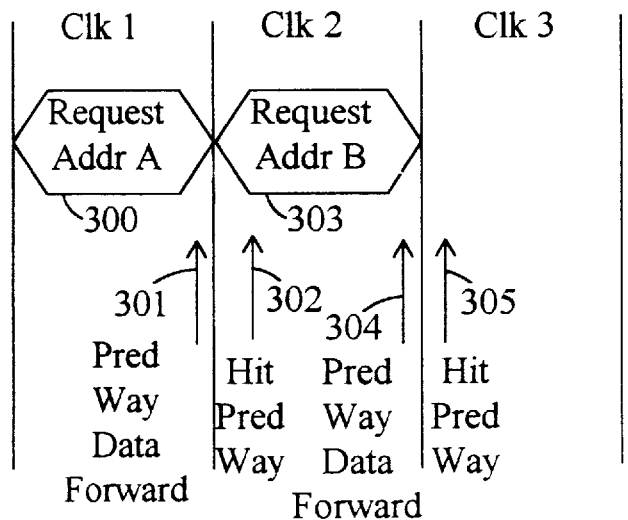
FIG. 3 is a timing diagram depicting a sequence of two cache accesses in which the way prediction is correct.

Turning now to FIG. 3, a timing diagram showing the operation of the way prediction structure for two successive correct way predictions is shown. Three clock cycles are shown, as indicated by the CLK1, CLK2, and CLK3 labels shown in FIG. 3. During CLK1, a request for an address "A" is conveyed from load/store unit 222 to data cache 224, as indicated by block 300. Near the end of CLK1, data from the predicted way is forwarded on data bus 258, as indicated by arrow 301. Early in CLK2, tag comparison block 259 determines that address A hits in the predicted way, and therefore the data conveyed on data bus 258 during CLK1 is correct. The corresponding signal on hit predicted way bus 260 is asserted, as indicated by arrow 302. Load/store unit 222 conveys a request for an address "B" in CLK2, as indicated by block 303. Data from the predicted way is forwarded on data bus 258 as indicated by arrow 304. During CLK3, tag comparison block 259 determines that address B hits in the way predicted during CLK2. Once again, the corresponding signal on hit predicted way bus 260 is asserted (as indicated by arrow 305). As can be seen from FIG. 3, the way prediction structure enables single clock cycle access to associative data cache 224 with access times characteristic of direct-mapped caches as long as the way prediction is correct.

Figure 4:
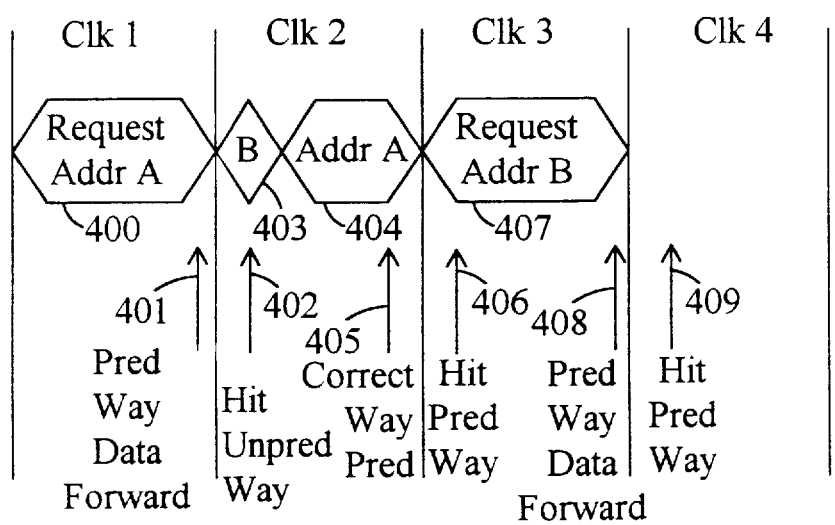
FIG. 4 is a timing diagram depicting a sequence of two cache accesses in which the way prediction for the first cache access is incorrect.

Turning next to FIG. 4, a timing diagram showing two consecutive accesses in which the first access hits in an unpredicted way is shown. As with FIG. 3, consecutive clock cycles are depicted on the timing diagram. The clock cycles are labeled CLK1, CLK2, CLK3, and CLK4. During CLK1, load/store unit 222 conveys a request for an address "A" to data cache 224, as indicated by block 400. Near the end of CLK1, data from the predicted way is forwarded on data bus 258, as indicated by arrow 401. Early in CLK2, tag comparison block 259 detects a hit in one of the unpredicted ways of data cache 224, and therefore the data conveyed on data bus 258 during CLK1 is incorrect. The corresponding signal on hit unpredicted way bus 261 is asserted, as indicated by arrow 402. Load/store unit 222 begins conveying a request for an address "B" on address request bus 250, but cancels that request due to the hit in the unpredicted way, as indicated by block 403. Address A is subsequently conveyed on address request bus 250 (shown as block 404). Near the end of CLK2, the way prediction array is updated with the corrected way prediction for address A and the correct data is forwarded on data bus 258 (as indicated by arrow 405). During CLK3, a hit in the predicted way will be signaled since the corrected way is conveyed on way prediction bus 257, as indicated by arrow 406. Therefore, one extra clock cycle is used to provide data which hits in an unpredicted way.

Also during CLK3, load/store unit 222 conveys the request for address B that it attempted to convey in CLK2 (as indicated by block 407). Since a hit in the predicted way is signaled by data cache 224, the request for address B remains active in CLK3 and data from the predicted way for address B is forwarded (as indicated by arrow 408). In CLK4, arrow 409 indicates that address B hits in the predicted way and so data forwarded during CLK3 with respect to address B data is correct. Another address request could be conveyed by load/store unit 222 in CLK4 and it would receive data forwarded from its predicted way near the end of CLK4.

It is noted that although the foregoing discussion describes the way prediction structure with respect to a data cache, a similar structure is contemplated for instruction caches as well.

Turning now to FIG. 4, a computer system 1000 including microprocessor 200, an interrupt controller 1004, a plurality of input/output (I/O) devices 1006A–1006N (referred to collectively as I/O devices 1006), a bus bridge 1008, a main memory 1010, and a cache 1012 is shown. Microprocessor 200, interrupt controller 1004, bus bridge 1008, main memory 1010, and cache 1012 are coupled to a CPU bus 1014 which effects high speed, high bandwidth communication between the connected devices. Lower speed, lower bandwidth communication is provided for I/O devices 1006 via input/output bus 1016. I/O devices 1006 are coupled to interrupt controller 1004 via an interrupt bus 1018.

Interrupt bus 1018 includes at least one interrupt conductor per I/O device 1006A–1006N. An interrupt request signal conveyed on the associated interrupt conductor is indicative of a request for interrupt of microprocessor 200 by the associated I/O device 1006A–1006N. Interrupt controller 1004 is configured to receive the interrupt request signals and to convey an interrupt signal to microprocessor 200 upon CPU bus 1014 in response to the interrupt request signals. In one embodiment, interrupt controller 1004 is an 8259A interrupt controller used in IBM compatible personal computer systems. In another embodiment, interrupt controller 1004 includes multiple interrupt controllers similar to the 8259A cascaded to allow a larger number of I/O devices 1006 to be connected. Interrupt controller 1004 is programmable, and may be enabled to assert the interrupt signal individually for each interrupt request signal. In other words, interrupt controller may be enabled to assert the interrupt signal if the interrupt request signal from I/O device 1006A is asserted but not if the interrupt request signal from I/O device 1006B is asserted (or vice-versa). In another embodiment, interrupt controller 1004 may be programmed with a priority scheme for the interrupt request signals. The priority scheme is devised such that, if multiple interrupt request lines are asserted concurrently: the highest priority interrupt request is service first; followed by the next highest priority interrupt request; etc.

Interrupt controller 1004 provides an interrupt vector which identifies the location of the interrupt service routine associated with the interrupting I/O device 1006A–1006N. The interrupt vector is transferred across CPU bus 1014 after microprocessor 200 acknowledges receipt of the interrupt signal. In one embodiment, microprocessor 200 issues an interrupt acknowledge transaction on CPU bus 1014 when acknowledging the interrupt signal, and then issues a second interrupt acknowledge transaction to collect the interrupt vector. Other transactions upon CPU bus 1014 are used to transfer data among devices coupled to CPU bus 1014. An exemplary bus implementing such an interrupt acknowledge transaction may be found within the publication entitled: "16-bit and 32-bit Microprocessors Architecture, Software and Interfacing Techniques" by Singh, et al, Prentice Hall, Englewood Cliffs, N.J., 1991. This publication is incorporated herein by reference in its entirety.

Bus bridge 1008 is provided to assist in communications (other than interrupt requests) between I/O devices 1006 and devices coupled to CPU bus 1014. I/O devices 1006 typically require longer bus clock cycles than microprocessor 200 and other devices coupled to CPU bus 1014. Therefore, bus bridge 1008 provides a buffer between CPU bus 1014 and input/output bus 1016. Additionally, bus bridge 1008 translates transactions from one bus protocol to another. In one embodiment, input/output bus 1016 is an Enhanced Industry Standard Architecture (EISA) bus and bus bridge 1008 translates from the CPU bus protocol to the EISA bus protocol. In another embodiment, input/output bus 1016 is a Peripheral Component Interconnect (PCI) bus and bus bridge 1008 translates from the CPU bus protocol to the PCI bus protocol. It is noted that many variations of CPU bus protocols exist. Microprocessor 200 may employ any suitable bus protocol.

I/O devices 1006 provide an interface between computer system 1000 and other devices external to the computer system. Exemplary I/O devices include a modem, a serial or parallel port, a sound card, etc. I/O devices 1006 may also be referred to as peripheral devices. Certain I/O devices 1006 may also be used to enhance the performance of computer system 1000 by performing certain tasks such that microprocessor 200 may perform other tasks. Exemplary devices include hardware accelerators. Main memory 1010 stores data and instructions for use by microprocessor 200. In one embodiment, main memory 1010 includes one or more dynamic random access memory (DRAM) cells and a DRAM memory controller. It is understood that main memory 1010 may be configured as multi-banked or interleaved memory. Cache 1012 is a small, high speed memory for temporarily storing data and instructions from main memory 1010. If microprocessor 200 requests an address from main memory 1010 and cache 1012 is storing data associated with the requested address, then cache 1012 provides the data. Cache 1012 is an optional component, and computer system 1000 is fully functional without it. However, cache 1012 may improve the performance of computer system 1000. It is noted that cache 1012 may also be inserted between microprocessor 200 and CPU bus 1014 in other embodiments. Although FIG. 4 shows a computer system 1000 including one microprocessor 200, computer system 1000 may include multiple microprocessors similar to microprocessor 200 coupled to CPU bus 1014.

It is noted that a superscalar microprocessor in accordance with the foregoing may further employ the latching structures as disclosed within the copending, commonly assigned patent application entitled "Conditional Latching Mechanism and Pipelined Microprocessor Employing the Same", Ser. No. 08/400608 filed Mar. 8, 1995, by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access" Ser. No. 08/473,103, filed Jun. 7, 1995 by Tran. The disclosure of this patent application is incorporated herein by reference in its entirety.

It is additionally noted that other aspects regarding superscalar microprocessors may be found in the co-pending, commonly assigned patent application entitled "Superscalar Microprocessor Including a High Performance Instruction Alignment Unit", Ser. No. 08/377,843, filed Jan. 25, 1995 by Witt, et al. The disclosure of this patent application is incorporated herein by reference in its entirety.

In accordance with the above disclosure, a way prediction structure has been described which enables access to an associative cache with an access time which is characteristic of a direct-mapped cache. Such a cache and way prediction structure may be advantageously incorporated into a high frequency superscalar microprocessor. Performance may be increased due to the better hit rates available with an associative cache and due to the shorter clock cycle achievable with the way prediction structure.

Numerous variations and modifications will become apparent to those skilled in the art once the above disclosure is fully appreciated. It is intended that the following claims be interpreted to embrace all such variations and modifications.

What is claimed is:

1. A way prediction structure for a cache comprising:
   a way prediction array including a plurality of storage locations wherein each one of said plurality of storage locations is configured to store a way value, and wherein said way prediction array is configured to receive at least one request address;
   a way prediction control unit coupled to said way prediction array wherein said way prediction control unit is configured to update said way prediction array;

a tag comparison block, wherein said tag comparison block is coupled to receive a way prediction from said way prediction array and to receive said request address, and wherein said tag comparison block is further coupled to receive a plurality of tag addresses from said cache, and wherein said tag comparison block is configured to compare said request address to said plurality of tag addresses and to produce a hit unpredicted way signal in response thereto, and wherein said hit unpredicted way signal indicates, when asserted, that said way prediction is incorrect and that said request address hits in a way other than a particular way indicated by said way prediction; and a reservation station coupled to receive said hit unpredicted way signal from said tag comparison block, wherein said reservation station is configured to invalidate a first datum forwarded by said cache in response to said way prediction if said hit unpredicted way signal is asserted.

2. The way prediction structure as recited in claim 1 wherein said way prediction array is a linear array.

3. The way prediction structure as recited in claim 1 wherein said way prediction is a particular way value stored within a selected one of said plurality of storage locations.

4. The way prediction structure as recited in claim 3 wherein said selected one of said plurality of storage locations is indexed by said request address.

5. The way prediction structure as recited in claim 1 wherein said way prediction control unit is configured to update said way prediction array during a clock cycle in which said way prediction is found to be incorrect.

6. The way prediction structure as recited in claim 1 wherein said way prediction control unit is adapted to receive said hit unpredicted way signal and wherein said way prediction control unit determines that said way prediction is incorrect if said hit unpredicted way signal is asserted.

7. The way prediction structure as recited in claim 1 wherein said tag comparison block is further configured to produce a hit way signal indicative of said way of said cache in which said request address hits.

8. The way prediction structure as recited in claim 7 wherein said way prediction control unit is adapted to receive said hit way signal and wherein said way prediction control unit is configured to update said way prediction array with said way during a clock cycle in which said way prediction is found to be incorrect.

9. The way prediction structure as recited in claim 8 further comprising said cache.

10. The way prediction structure as recited in claim 9 wherein said cache is a data cache.

11. The way prediction structure as recited in claim 10 further comprising a load/store unit coupled to said data cache wherein said load/store unit is configured to execute load and store instructions.

12. The way prediction structure as recited in claim 11 wherein said load/store unit is configured to access said data cache with said request address during said clock cycle if said hit unpredicted way signal is asserted.

13. The way prediction structure as recited in claim 1 wherein said tag comparison block is configured to produce a hit predicted way signal in response to comparing said plurality of tag addresses, and wherein said hit predicted way signal indicates, when asserted, that said way prediction is correct, and wherein said reservation station is configured to discard an instruction which receives said first datum as an operand if said hit predicted way signal is asserted and said instruction is executed upon receipt of said first datum.

14. The way prediction structure as recited in claim 13 wherein said reservation station is configured to invalidate said first datum if both said hit predicted way signal and said hit unpredicted way signal are deasserted.

15. The way prediction structure as recited in claim 1 wherein said tag comparison block is configured to assert a miss signal in response to comparing said plurality of tag addresses to said request address if none of said plurality of tag addresses match said request address, and wherein said reservation station is configured to invalidate said first datum if said miss signal is asserted.

16. A way prediction structure for a cache comprising:

a way prediction array including a plurality of storage locations wherein each one of said plurality of storage locations is configured to store a way value, and wherein said way prediction array is configured to receive at least one request address;

a way prediction control unit coupled to said way prediction array;

a tag comparison block, wherein said tag comparison block is coupled to receive a way prediction from said way prediction array and to receive said request address, and wherein said tag comparison block is further coupled to receive a plurality of tag addresses from said cache, and wherein said tag comparison block is configured to compare said request address to said plurality of tag addresses and to produce a hit unpredicted way signal in response thereto, and wherein said hit unpredicted way signal indicates, when asserted, that said way prediction is incorrect and that said request address hits in a way other than a particular way indicated by said way prediction, and wherein said tag comparison block is further configured to produce a hit way signal indicative of said way of said cache in which said request address hits; and a reservation station coupled to receive said hit unpredicted way signal from said tag comparison block, wherein said reservation station is configured to invalidate a first datum forwarded by said cache in response to said way prediction if said hit unpredicted way signal is asserted;

wherein said way prediction control unit is configured to update said way prediction array during a clock cycle in which said way prediction is determined to be incorrect.

* * * * *